United States Patent
Saarikko et al.

(10) Patent No.: US 9,753,297 B2
(45) Date of Patent: Sep. 5, 2017

(54) OPTICAL APPARATUS AND METHOD FOR EXPANDING AN EXIT PUPIL

(75) Inventors: Pasi Saarikko, Espoo (FI); Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 125 days.

(21) Appl. No.: 13/581,847

(22) PCT Filed: Mar. 4, 2010
(Under 37 CFR 1.47)

(86) PCT No.: PCT/IB2010/050946
§ 371 (c)(1),
(2), (4) Date: Nov. 7, 2012

(87) PCT Pub. No.: WO2011/107831
PCT Pub. Date: Sep. 9, 2011

(65) Prior Publication Data
US 2013/0314789 A1    Nov. 28, 2013

(51) Int. Cl.
*G02B 27/44* (2006.01)
*G02B 27/00* (2006.01)
(Continued)

(52) U.S. Cl.
CPC ......... *G02B 27/44* (2013.01); *G02B 27/0081* (2013.01); *G02B 27/0905* (2013.01);
(Continued)

(58) Field of Classification Search
CPC .. G02B 5/3083; G02B 5/1814; G02B 5/1866; G02B 5/1842; G02B 6/126; G02B 6/124;
(Continued)

(56) References Cited

U.S. PATENT DOCUMENTS

| 7,181,108 B2 * | 2/2007 | Levola ........................... 385/37 |
| 2010/0214659 A1 * | 8/2010 | Levola ................. G02B 5/1814 359/566 |

FOREIGN PATENT DOCUMENTS

| WO | WO 2006/064325 A1 | 6/2006 |
| WO | WO 2006/064334 A1 | 6/2006 |

(Continued)

*Primary Examiner* — Jie Lei
(74) *Attorney, Agent, or Firm* — Harrington & Smith

(57) ABSTRACT

A first optical arrangement is configured to couple into an apparatus a first component of a light beam having a wavelength within a first spectral range; a second optical arrangement configured to couple a second component of the light beam having a wavelength within a different second spectral range; a third optical arrangement configured to expand the first component in a first dimension to create an expanded first component; a fourth optical arrangement configured to expand, in a second dimension, the expanded first component to create a further expanded first component, and to output the further expanded first component; a fifth optical arrangement configured to expand the second component in the second dimension to create an expanded second component; and a sixth optical arrangement configured to expand, in the first dimension, the expanded second component to create a further expanded second component, and to output the further expanded second component.

28 Claims, 14 Drawing Sheets

(51) Int. Cl.
*G02B 27/09* (2006.01)
*G02B 27/28* (2006.01)
*G02B 27/42* (2006.01)
*F21V 8/00* (2006.01)

(52) U.S. Cl.
CPC ........... *G02B 27/283* (2013.01); *G02B 27/42* (2013.01); *G02B 6/0038* (2013.01); *G02B 6/0058* (2013.01)

(58) Field of Classification Search
CPC ...... G02B 27/44; G02B 27/46; G02B 27/283; G02B 27/42; G02B 27/0905; G02B 27/0081; G02B 6/0038; G02B 6/0058; G11B 7/1353
USPC .......... 359/489.07, 558, 566, 567, 569, 618; 385/11, 37
See application file for complete search history.

(56) References Cited

FOREIGN PATENT DOCUMENTS

WO  WO 2008/038058 A1  4/2008
WO  WO 2008/148927 A1  12/2008

* cited by examiner

OPTICAL APPARATUS AND METHOD FOR EXPANDING AN EXIT PUPIL

FIELD

Embodiments of the present invention relate to an optical apparatus and method. In particular, they relate to an optical apparatus for expanding an exit pupil to enable a user to view a virtual display.

BACKGROUND

A portable electronic device may include a display that enables a user to view content, such as images or video. The display may be situated on a face of the portable device. Typically, the size of the display is restricted by a need to keep the size of the portable device relatively small.

BRIEF DESCRIPTION OF VARIOUS EMBODIMENTS OF THE INVENTION

According to some, but not necessarily all, embodiments of the invention, there is provided an apparatus, comprising: a first optical arrangement configured to couple a first component of a light beam into the apparatus, the first component of the light beam having a wavelength within a first spectral range; a second optical arrangement configured to couple a second component of the light beam into the apparatus, the second component of the light beam having a wavelength within a second spectral range, different to the first spectral range; a third optical arrangement configured to expand the first component of the light beam in a first dimension to create an expanded first component; a fourth optical arrangement configured to expand, in a second dimension, the expanded first component to create a further expanded first component, and configured to output the further expanded first component of the light beam from the apparatus; a fifth optical arrangement configured to expand the second component of the light beam in the second dimension to create an expanded second component; and a sixth optical arrangement configured to expand, in the first dimension, the expanded second component to create a further expanded second component, and configured to output the further expanded second component from the apparatus.

According to some, but not necessarily all, embodiments of the invention, there is provided a method, comprising: coupling a first component of a light beam into an exit pupil expander, the first component of the light beam having a wavelength within a first spectral range; coupling a second component of the light beam into the exit pupil expander, the second component of the light beam having a wavelength within a second spectral range, different to the first spectral range; expanding the first component of the light beam in a first dimension to create an expanded first component; expanding, in a second dimension, the expanded first component to create a further expanded first component; expanding the second component of the light beam in the second dimension to create an expanded second component; expanding, in the first dimension, the expanded second component to create a further expanded second component; outputting the further expanded first component of the light beam from the exit pupil expander; and outputting the further expanded second component from the exit pupil expander.

According to some, but not necessarily all, embodiments of the invention, there is provided an apparatus, comprising: means for coupling a first component of a light beam into the apparatus, the first component of the light beam having a wavelength within a first spectral range; means for coupling a second component of the light beam into the apparatus, the second component of the light beam having a wavelength within a second spectral range, different to the first spectral range; means for expanding the first component of the light beam in a first dimension to create an expanded first component; means for expanding, in a second dimension, the expanded first component to create a further expanded first component, and configured to output the further expanded first component of the light beam from the apparatus; means for expanding the second component of the light beam in the second dimension to create an expanded second component; and means for expanding, in the first dimension, the expanded second component to create a further expanded second component, and configured to output the further expanded second component from the apparatus.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EXEMPLARY EMBODIMENTS OF THE INVENTION

Figure 1:
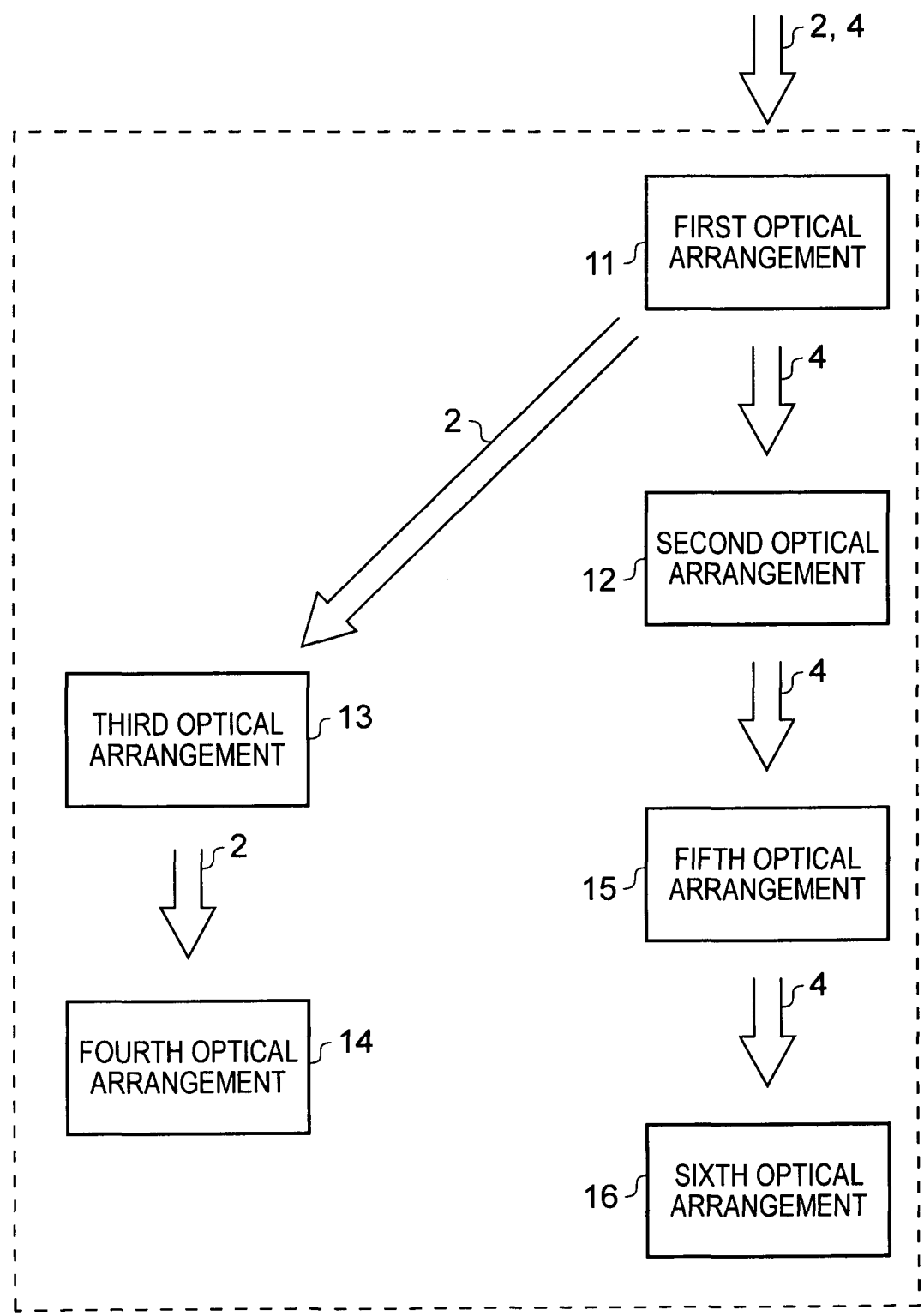
FIG. 1 illustrates a functional schematic of an apparatus.

FIG. 1 is a functional schematic of an apparatus 10. The apparatus 10 is an optical apparatus for expanding the exit pupil of an optical engine. The apparatus 10 comprises first, second, third, fourth, fifth and sixth optical arrangements 11-16.

FIG. 1 illustrates a light beam 2, 4 being directed towards a first optical arrangement 11 of the apparatus 10. The light beam 2, 4 comprises a first component 2, having a wavelength within a first spectral range, and a second component 4, having a wavelength within a second spectral range. The first spectral range may, for example, correspond with blue-green light. The second spectral range may, for example, correspond with red light. It may be that the first spectral range does not overlap with the second spectral range.

The first optical arrangement 11 is configured to couple the first component 2 of the light beam into the apparatus 10 and to direct the in-coupled first component 2 of the light beam towards the third optical arrangement 13.

The second optical arrangement 12 is configured to couple the second component 4 of the light beam into the apparatus 10 and to direct the in-coupled second component 4 of the light beam towards the fifth optical arrangement 15. In the example illustrated in FIG. 1, the second component 4 passes through the first optical arrangement 11 prior to being coupled into the apparatus 10 by the second optical arrangement 12.

The third optical arrangement 13 is configured to expand the first component 2 of the light beam, in a first dimension, to create an expanded first component 2. The first component 2 may, for example, be expanded by diffraction. The third optical arrangement 13 is configured to direct the expanded first component 2 of the light beam towards the fourth optical arrangement 14.

The fourth optical arrangement 14 is configured to expand the expanded first component 2 of the light beam in a second dimension, to create a further expanded first component 2. The first component 2 may, for example, be further expanded by diffraction. The fourth optical arrangement 14 is configured to output the further expanded first component 2 of the light beam from the apparatus 10.

The fifth optical arrangement 15 is configured to expand the second component 4 of the light beam, in the second dimension, to create an expanded second component 4. The second component 4 may, for example, be expanded by diffraction. The fifth optical arrangement 15 is configured to direct the expanded second component 4 of the light beam towards the sixth optical arrangement 16.

The sixth optical arrangement 16 is configured to expand the expanded second component 4 of the light beam in the first dimension, to create a further expanded second component 4. The second component 4 may, for example, be further expanded by diffraction. The sixth optical arrangement 16 is configured to output the further expanded second component 4 of the light beam from the apparatus 10.

Figure 2A:
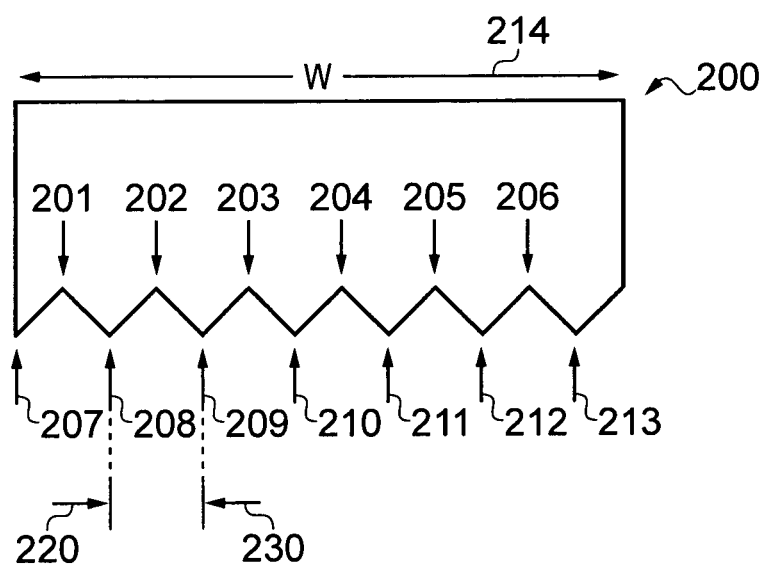
FIG. 2A illustrates a cross section of a ruled diffraction grating.
Figure 2B:
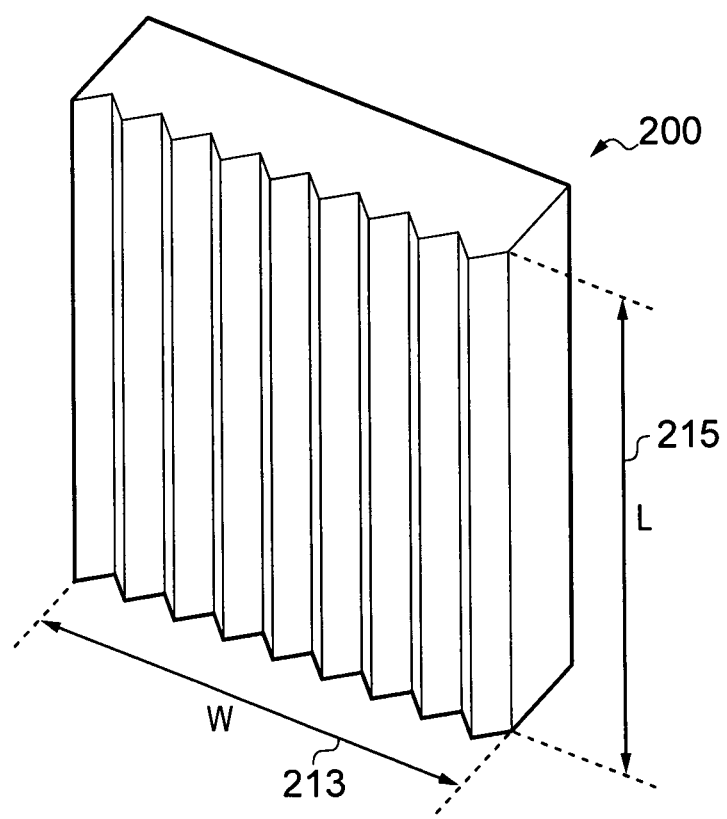
FIG. 2B illustrates a perspective view of the ruled diffraction grating.

FIG. 2A illustrates a cross section of an exemplary ruled diffraction grating 200 having a width 214 and a length 215. FIG. 2B illustrates a perspective view of the ruled diffraction grating 200. The ruled diffraction grating 200 comprises a plurality of protrusions 207-213 and a plurality of recesses 201-206 distributed across the width 214 of the grating 200.

Adjacent protrusions (for instance, those denoted by the reference numerals 207 and 208) are separated by a recess (in this instance, denoted by the reference numeral 201). Adjacent recesses are separated by a protrusion. Each recess is elongate in nature and extends along the length 215 of the grating 200. Similarly, each protrusion is elongate in nature and extends along the length of the grating 200.

The 'grating period' is the distance between two adjacent protrusions. The grating period is illustrated in FIG. 2A by arrows 220 and 230. The elongate protrusions of a ruled grating are typically called 'grating lines' in the art. Similar terminology is used here. Each grating line has an associated grating vector that is perpendicular to the grating lines.

Figure 3A:
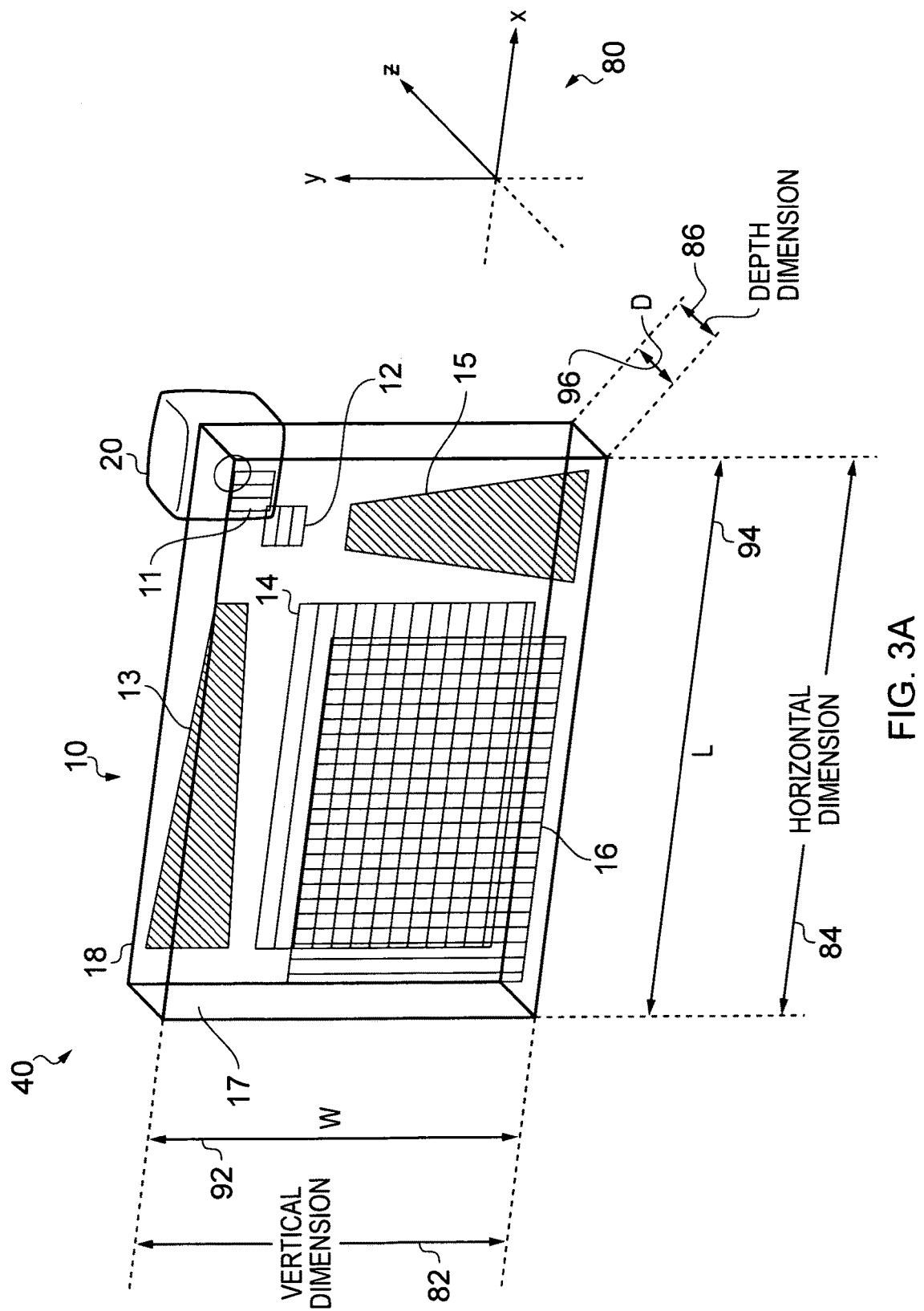
FIG. 3A illustrates a perspective view of the apparatus.

FIG. 3A illustrates a system 40 comprising an optical engine 20 and an apparatus 10. The optical engine 20 may, for example, comprise a display and one or more optical devices (for example, lenses). The display may, for example, be a micro-display that comprises pixels at more than fifty lines per millimeter. The one or more optical devices are for magnifying an image displayed on the display.

In this example, divergent light emanates from each pixel on the display. At least a portion of the divergent light emanating from each pixel is collimated by the one or more optical devices and output from the optical engine 20 as a collimated light beam. The optical engine 20 may, for instance, output a light beam for each and every one of the pixels of the display. Each light beam has a diameter that is substantially equal to the exit pupil of the optical engine 20.

Each one of the light beams output by the optical engine 20 can be considered to comprise a bundle of light rays. The light rays within a particular light beam are substantially parallel to one another.

The light beams output by the optical engine 20 diverge from one another. That is, the light rays from one light beam diverge from the light rays from another light beam.

The apparatus 10 is an exit pupil expander for expanding the exit pupil of the optical engine 20. The exit pupil expander 10 illustrated in FIG. 3A is cuboidal in shape. The illustrated exit pupil expander 10 has a length L, a width W and a depth/thickness D. The length is denoted by the reference numeral 94 in FIG. 3A, the width is denoted by the reference numeral 92 and the depth is denoted by the reference numeral 96.

In this example, the length 94 of the exit pupil expander 10 is considered to be aligned with a horizontal dimension 84, the width 92 is considered to be aligned with a vertical dimension 82 and the depth 96 is considered to be aligned with a depth dimension 86.

The horizontal dimension 84 is orthogonal to the vertical dimension 82 and the depth dimension 86. The vertical dimension 82 is orthogonal to the horizontal dimension 84 and the depth dimension 86. The depth dimension 86 is orthogonal to the vertical dimension 82 and the horizontal dimension 84.

The length 94 of the exit pupil expander 10 is greater than the width 92, which is in turn greater than the depth 96. The length 94 and the width 92 define a first (front) face 17 and a second (rear) face 18 of the exit pupil expander 10.

The exit pupil expander 10 comprises first, second, third, fourth, fifth and sixth optical arrangements 11-16. The first, second, third, fourth, fifth and sixth optical arrangements 11-16 may, for example, be diffraction gratings.

For ease of explanation, an implementation of the invention will be described in which all of the optical arrangements 11-16 are surface relief diffraction gratings, which have been made, for example, by ruling, etching or lithographic methods. However, alternatively some or all of the optical arrangements could instead be holographic elements or other entities which behave like diffraction gratings.

The direction of the lines illustrated at each optical arrangement 11-16 in FIG. 3A indicates the direction of the 'grating lines' in each optical arrangement 11-16. As mentioned above, each grating line has an associated grating vector that is perpendicular to the grating line.

In this example, the exit pupil expander 10 is formed from a single substrate. That is, the exit pupil expander 10 is integrally formed.

In the example illustrated in FIG. 3A, the first, third and fourth optical arrangements 11, 13, 14 are situated on the rear face 18 of the exit pupil expander 10 and the second, fifth and sixth optical arrangements 12, 15, 16 are situated on the front face 17 of the exit pupil expander 10.

Co-ordinate axes 80 are illustrated in FIG. 3A. The illustration of the co-ordinate axes 80 in FIGS. 3B to 6 indicates the orientation of the exit pupil expander 10 in these figures relative to that illustrated in FIG. 3A.

Figure 3B:
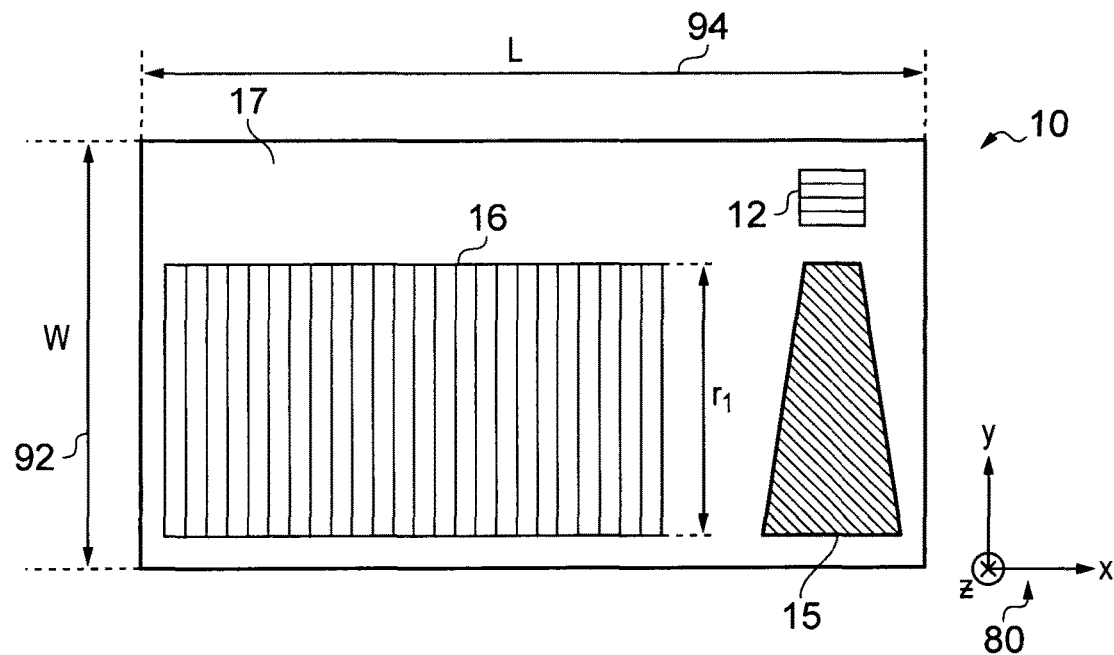
FIG. 3B illustrates a front view of the apparatus.

FIG. 3B illustrates the front face 17 of the exit pupil expander 10 comprising the second, fifth and sixth optical arrangements 12, 15, 16. In the illustrated example, each of the second, fifth and sixth optical arrangements 12, 15, 16 is separated from the other optical arrangements 12, 15, 16 on the front face 17. The second optical arrangement 12 covers a smaller surface area of the front face 17 than the fifth optical arrangement 15 or the sixth optical arrangement 16. In the illustrated example, the second optical arrangement 12 is substantially square in shape. Alternatively, the second optical arrangement 12 could be a different shape, such as circular, rectangular or elliptical for example.

The fifth optical arrangement 15 is located beneath the second optical arrangement 12 on the front face 17. The fifth optical arrangement 15 is trapezoidal in shape, having two parallel sides (of different lengths) aligned with the length 94 of the exit pupil expander 10 (and the horizontal dimension 84). The shortest parallel side is closer to the second optical arrangement 12 than the longest parallel side. The length of the fifth optical arrangement 15 is denoted $r_1$ in FIG. 3B. The length of the fifth optical arrangement 15 is the same as the width of the sixth optical arrangement 16 in the FIG. 3B example.

In alternative embodiments of the invention, the fifth optical arrangement 15 could be rectangular in shape. Use of a trapezoidal fifth optical arrangement 15 is, however, advantageous because it causes fewer secondary diffractions to occur, as compared with a rectangular fifth optical arrangement 15.

In the illustrated example, the fifth optical arrangement 15 covers a larger surface area than the second optical arrangement 12, and a smaller surface area than the sixth optical arrangement 16.

The sixth optical arrangement 16 is located to one side of the fifth optical arrangement 15. The sixth optical arrangement 16 is rectangular in shape, having its longest sides aligned with the length 94 of the exit pupil expander 10. In alternative embodiments of the invention, the sixth optical arrangement 16 may be of a different shape (for example, elliptical). In the illustrated example, the sixth optical arrangement 16 covers a larger surface area than the fifth optical arrangement 15 or the second optical arrangement 12.

In this example, the grating lines of the second optical arrangement 12 extend in a direction that is substantially parallel to the horizontal dimension 84 and the length 94 of the exit pupil expander 10. However, in other implementations of the invention, this may not be the case. In this example, the grating lines of the sixth optical arrangement 16 extend in a direction that is substantially parallel to vertical dimension 82 and the width 92 of the exit pupil expander 10. However, in other implementations of the invention, this may not be the case.

The grating lines of the fifth optical arrangement 15 are angled with respect to the grating lines of the second optical arrangement 12 and the grating lines of the sixth optical arrangement 16. The angle of the grating lines of the fifth optical arrangement 15 with respect to the grating lines of the second optical arrangement 12 is the same as the angle of the grating lines of fifth optical arrangement 15 with respect to the sixth optical arrangement 16. The angle depends upon the orientation of the grating lines in the second and sixth optical arrangements 12, 16 and may, for example, be in the region of 35°-55°. It is possible for the angle to be below 35° or above 55°. However, for angles below 35° or above 55°, higher cross talk and loss occurs, which can be suppressed with proper polarization and groove design to a level that is low enough for most of the viewing applications.

In the illustrated example, the grating lines of the second and sixth optical arrangements 12, 16 are aligned with the horizontal and vertical dimensions 84, 82 respectively, and the angle of the grating lines of the fifth optical arrangement 15 with respect to those of the second and sixth optical arrangements 12, 16 is 45°.

The second optical arrangement 12 is optimized to in-couple light (in this example, by diffraction) having a wavelength within a particular (second) spectral range into the exit pupil expander 10. That is, the second optical arrangement 12 is configured to be more efficient at coupling light having a wavelength within the second spectral range (for instance, corresponding to red light) into the exit pupil expander 10 than light having a wavelength in another spectral range (such as the first spectral range which may, for example, correspond to blue-green light).

The sixth optical arrangement 16 is optimized to out-couple light (in this example, by diffraction) having a wavelength within the second spectral range from the exit pupil expander 10. The grating period of the second optical arrangement 12 and the sixth optical arrangement 16 may be substantially the same. If the second spectral range relates to red light, the grating period of the second optical arrangement 12 and the sixth optical arrangement 16 may be in the region of 500 nanometers.

The grating period $d_1'$ of the fifth optical arrangement 15 is given by the equation:

$$d_1' = \frac{d_1}{2\cos\rho_1}$$

where $d_1$=the grating period of the second and sixth optical arrangements 12, 16 and $\rho_1$=the angle of grating lines of the fifth optical arrangement 15 with respect to the second optical arrangement 12.

Figure 3C:
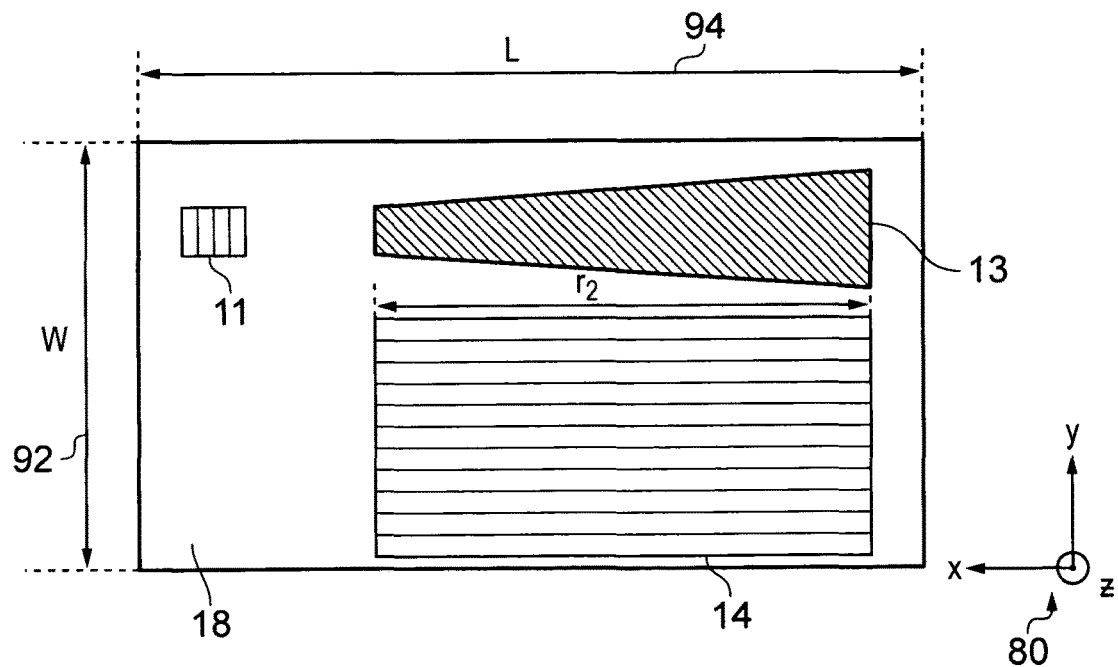
FIG. 3C illustrates a rear view of the apparatus.

FIG. 3C illustrates the rear face 18 of the exit pupil expander 10 comprising the first, third and fourth optical arrangements 11, 13, 14. In the illustrated example, each of the first, third and fourth optical arrangements 11, 13, 14 is separated from the other optical arrangements 11, 13, 14 on the rear face 18. The first optical arrangement 11 covers a smaller surface area of the rear face 18 than the third optical arrangement 13 or the fourth optical arrangement 14. In the illustrated example, the first optical arrangement 11 is substantially square in shape. Alternatively, the first optical arrangement 11 could be of a different shape (for example circular, rectangular or elliptical).

In the example illustrated in FIG. 3A, the position of the first optical arrangement 11 coincides with the second optical arrangement 12 in both the horizontal dimension 84 and the vertical dimension 82. However, in other implementations of the invention, this may not be the case. In the example illustrated in FIG. 3A, the first optical arrangement 11 is separated from the second optical dimension 12 in the depth dimension 86.

The third optical arrangement 13 is located to one side of the first optical arrangement 11 on the rear face 18. The third optical arrangement 13 is trapezoidal in shape, having two parallel sides (of different lengths) aligned with the width 92 of the exit pupil expander 10 (and the vertical dimension 82). The shortest parallel side is closer to the first optical arrangement 11 than the longest parallel side.

In alternative embodiments of the invention, the third optical arrangement 13 could be rectangular in shape. Use of a trapezoidal third optical arrangement 13 is, however, advantageous because it causes fewer secondary diffractions to occur, as compared with a rectangular third optical arrangement 13.

In the illustrated example, the third optical arrangement 13 covers a larger surface area than the first optical arrangement 11, and a smaller surface area than the fourth optical arrangement 14.

The fourth optical arrangement 14 is located beneath the third optical arrangement 13 on the rear side 18 of the exit pupil expander 10. The fourth optical arrangement 14 is rectangular in shape, having its longest sides aligned with the length of the exit pupil expander 10. In alternative embodiments of the invention, the fourth optical arrangement 14 may be of a different shape (for example, elliptical). In the illustrated example, the fourth optical arrangement 14 covers a larger surface area than the third optical arrangement 14 or the first optical arrangement 11. The length of the third optical arrangement 13 is denoted $r_2$ in FIG. 3C. The length of the third optical arrangement 13 is the same as the length of the fourth optical arrangement 14 in the FIG. 3C example.

In the example illustrated in FIG. 3A, the position of the fourth optical arrangement 14 coincides with the sixth optical arrangement 16 in both the horizontal dimension 84 and the vertical dimension 82. However, in other implementations of the invention, this may not be the case. In the example illustrated in FIG. 3A, the fourth optical arrangement 14 is separated from the sixth optical dimension 16 in the depth dimension 86.

In this example, the grating lines of the first optical arrangement 11 extend in a direction that is substantially parallel to the vertical dimension 82 and the width 94 of the exit pupil expander 10. However, in other implementations of the invention, this may not be the case. In this example, the grating lines of the fourth optical arrangement 14 extend in a direction that is substantially parallel to horizontal dimension 84 and the length 94 of the exit pupil expander 10. However, in other implementations of the invention, this may not be the case.

The grating lines of the third optical arrangement 13 are angled with respect to the grating lines of the first optical arrangement 11 and the grating lines of the fourth optical arrangement 14. The angle of the grating lines of the third optical arrangement 13 with respect to the grating lines of the first optical arrangement 12 is the same as the angle of the grating lines of the third optical arrangement 13 with respect to the grating lines of the fourth optical arrangement 14. The angle depends upon the orientation of the grating lines in the first and fourth optical arrangements 11, 14 and may, for example, be in the region of 35°-55°. It is possible for the angle to be below 35° or above 55°. However, for angles below 35° or above 55°, higher cross talk and loss occurs, which can be suppressed with proper polarization and groove design to a level that is low enough for most of the viewing applications.

In the illustrated example, the grating lines of the first and fourth optical arrangements 11, 14 are aligned with the vertical and horizontal dimensions 82, 84 respectively, and the angle of the grating lines of the third optical arrangement 13 with respect to those of the first and fourth optical arrangements 11, 14 is 45°.

The first optical arrangement 11 is optimized to in-couple light having a wavelength within a particular (first) spectral range into the exit pupil expander 10. That is, the first optical arrangement 11 is configured to be more efficient at coupling light having a wavelength within the first spectral range (for instance, corresponding to blue-green) into the exit pupil expander 10 than light having a wavelength in another spectral range, such as the second spectral range (for example, corresponding to red light).

A small amount of light from the first component of a light beam may be coupled into the exit pupil expander 10 by the second optical arrangement 12. However, a higher proportion of the first component of a particular light beam is coupled into the exit pupil expander 10 by the first optical arrangement 11 than by the second optical arrangement 12. Similarly, a higher proportion of the second component of a particular light beam is coupled into the exit pupil expander 10 by the second optical arrangement 12 than by the first optical arrangement 11.

The fourth optical arrangement 14 is optimized to out-couple light within the first spectral range from the exit pupil expander 10. The grating period of the first optical arrangement 11 and the fourth optical arrangement 14 may be substantially the same. If the first spectral range relates to blue-green light, the grating period of the first optical arrangement 11 and the fourth optical arrangement 14 may be in the region of 400 nm nanometers.

The grating period $d_2'$ of the third optical arrangement 13 is given by the equation:

$$d_2' = \frac{d_2}{2\cos\rho_2}$$

where $d_2$=the grating period of the first and fourth optical arrangements 11, 14 and $\rho_2$=the angle of grating lines of the third optical arrangement 13 with respect to the first optical arrangement 11.

Figure 4A:
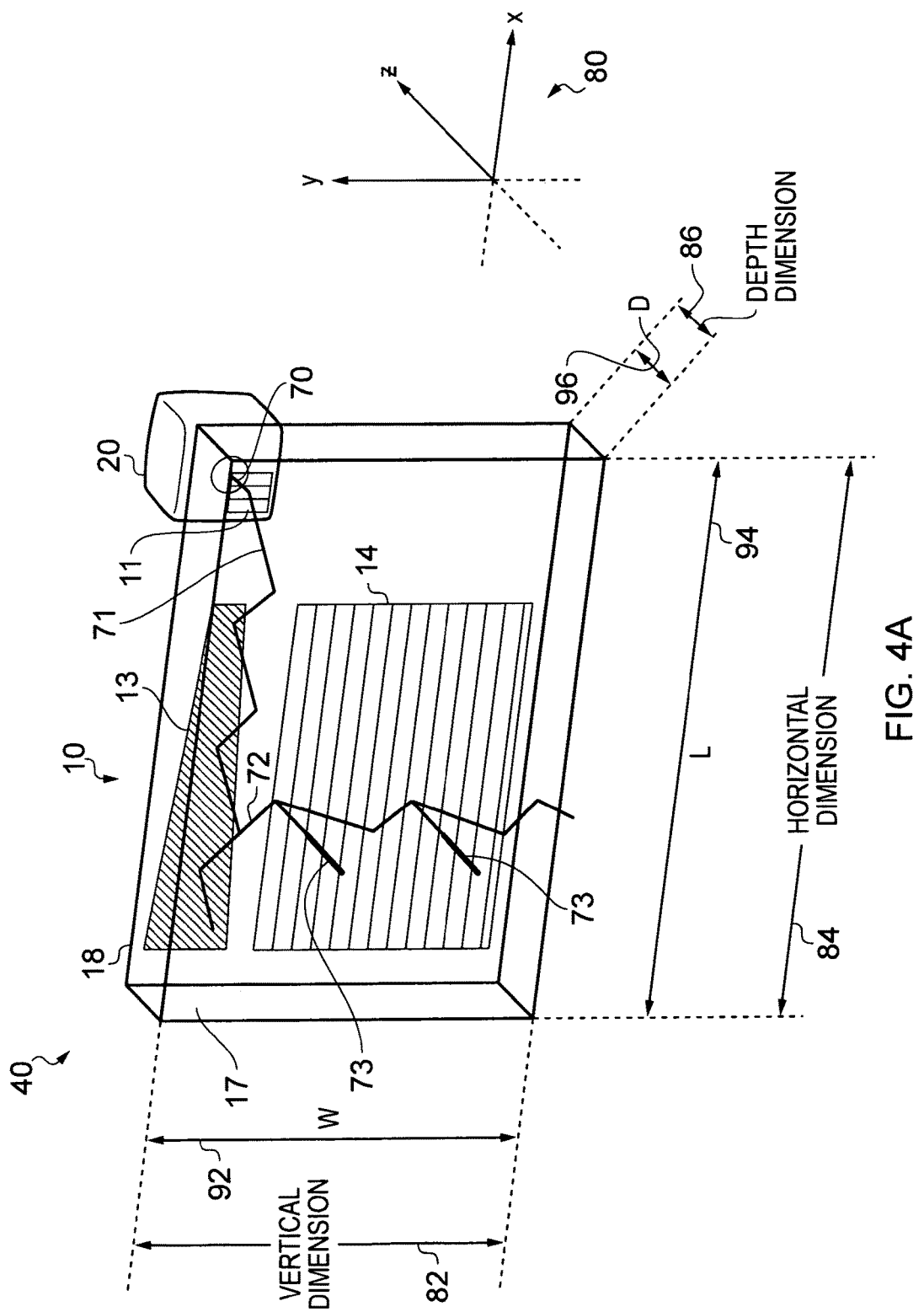
FIG. 4A illustrates a perspective view of the apparatus in use, expanding light having a wavelength within a first spectral range.

FIG. 4A illustrates the system 40 in use. The second, fifth and sixth optical arrangements 12, 15, 16 are not illustrated on the exit pupil expander 10 in FIG. 4A for clarity reasons.

Figure 4B:
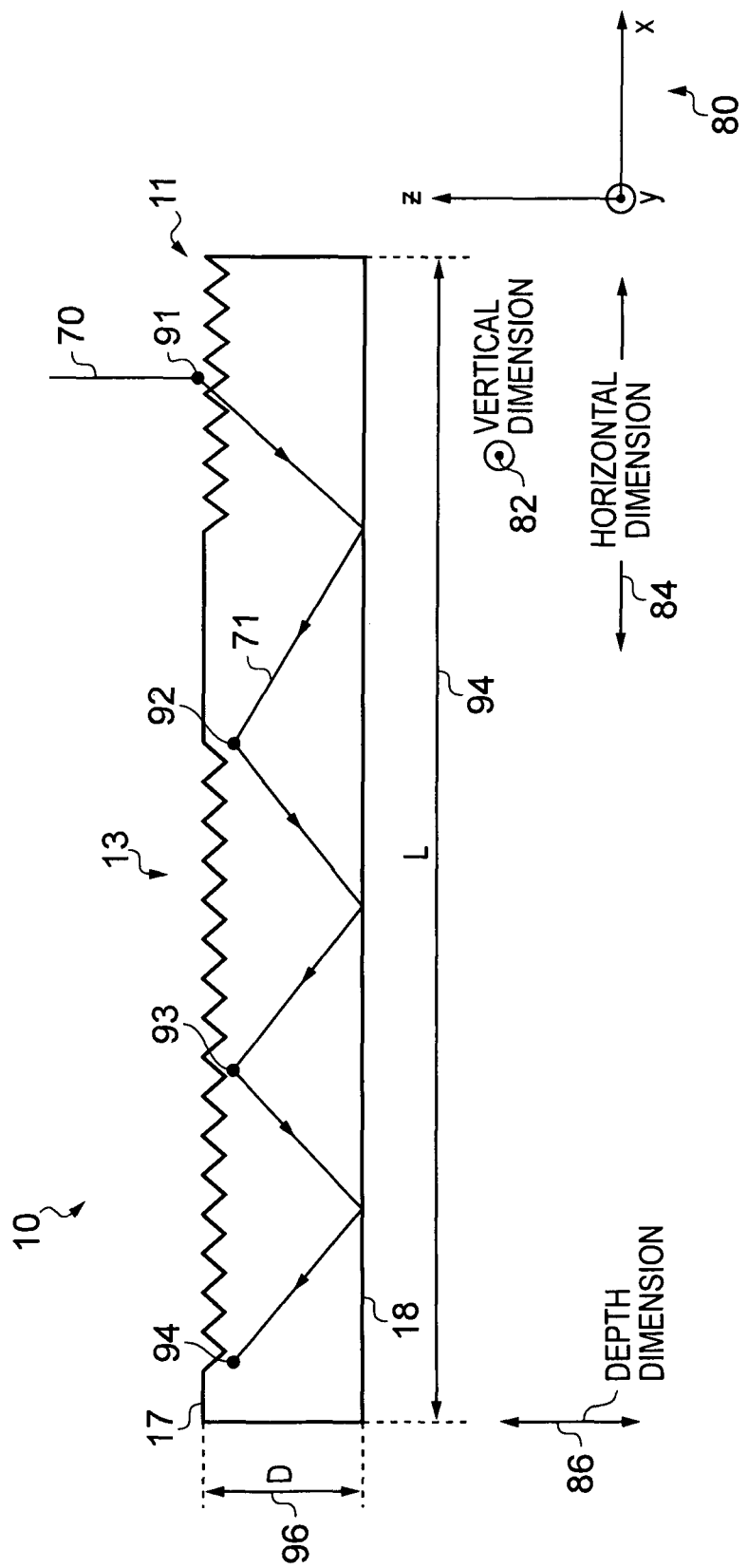
FIG. 4B illustrates a first cross section of the apparatus in use, expanding light having a wavelength within the first spectral range.

The optical engine 20 outputs multiple light beams in the manner described above and directs them towards the rear face 18 of the exit pupil expander 10. FIG. 4B illustrates a first component of a light beam, comprising a light ray 70, being output by the optical engine 20. The first component of the light beam has a wavelength in the first spectral range (corresponding with blue-green light in this example).

When the first component of the light beam meets the first optical arrangement 11, it is coupled into the exit pupil expander 10 by the first optical arrangement 11. The first optical arrangement 11 is configured to direct the first component of the light beam in a first direction, towards the third optical arrangement 13. In this example, the first direction has a component in the horizontal dimension 84 and a component in the depth dimension 86, but does not have a component in the vertical dimension 82.

FIG. 4B illustrates a cross-section of the exit pupil expander 10 that is taken through the first and third optical arrangements 11, 13 in a plane defined by the horizontal dimension 84 and the depth dimension 86.

FIG. 4B shows the light ray 70 being diffracted by the first optical arrangement 11 when it reaches the first optical arrangement 11 at point 91. The diffracted light ray is denoted with the reference numeral 71.

In this example, when the first component of the light beam has been coupled into the exit pupil expander 10, it undergoes total internal reflection within the exit pupil expander 10. The first component of the light beam is guided within the exit pupil expander 10 in the horizontal dimension 84. This is depicted by the path of the light ray 71 illustrated in FIGS. 4A and 4B.

When the first component of the light beam has been coupled into the exit pupil expander 10 it may meet the second optical arrangement 12. However, since the grating lines of the second optical arrangement 12 are substantially orthogonal to the grating lines of the first optical arrangement 11, and because the grating period of the second optical arrangement 12 is optimized to diffract light having a wavelength different to that of the first component, there will be substantially no further diffraction of the in-coupled first component by second optical arrangement 12.

As the first component of the light beam travels across the exit pupil expander 10 in the horizontal dimension 84, it meets the third optical arrangement 13 on multiple occasions. FIG. 4B schematically illustrates the light ray 71 meeting the third optical arrangement 13 on three occasions, denoted by points 92-94.

Each time the first component of light beam meets the third optical arrangement 13, a portion of the light beam is diffracted towards the fourth optical arrangement 14 and the remainder of the light beam continues travelling along the exit pupil expander 10 in the horizontal dimension 84.

The multiple diffractions that occur as the light beam travels across the third optical arrangement 13 cause expansion of the first component of the light beam in the horizontal dimension 84, creating an expanded first component of the light beam. FIG. 4A illustrates a light ray 72 from the expanded first component of the light beam travelling towards the fourth optical arrangement 14.

Figure 4C:
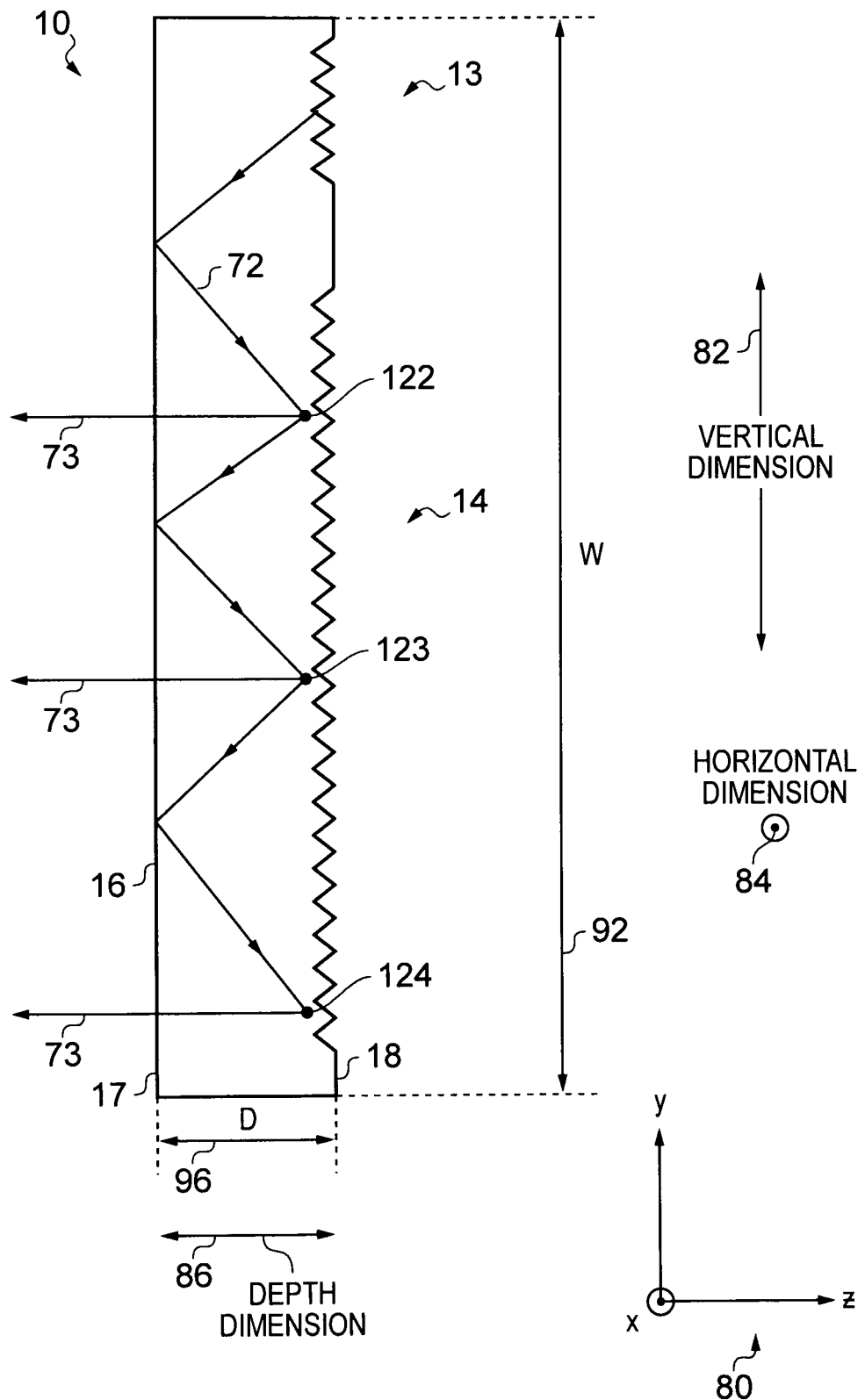
FIG. 4C illustrates a second cross section of the apparatus in use, expanding light having a wavelength within a first spectral range.

FIG. 4C illustrates a cross section of the exit pupil expander 10 that is taken through the third and fourth optical arrangements 13, 14 in a plane defined by the vertical dimension 82 and the depth dimension 86.

The expanded first component of the light beam undergoes total internal reflection within the exit pupil expander 10, following diffraction by the third optical arrangement 13. The expanded first component of the light beam is guided within the exit pupil expander 10 in the vertical dimension 82. This is depicted by the path of the light ray 72 illustrated in FIGS. 4A and 4C.

As the expanded first component of the light beam travels across the exit pupil expander 10 in the vertical dimension 82, it meets the fourth and sixth optical arrangements 14, 16 on multiple occasions. FIG. 4C schematically illustrates the light ray 72 meeting the fourth optical arrangement 14 on three occasions, denoted by points 122-124.

Each time the expanded first component of light beam meets the fourth optical arrangement 14, a portion of the expanded first component of the light beam is diffracted. The remainder of the light beam continues travelling along the exit pupil expander 10 in the vertical dimension 82.

The multiple diffractions that occur as the light beam travels across the fourth optical arrangement 14 cause expansion of the expanded first component of the light beam in the vertical dimension 82, creating a further expanded first component of the light beam.

The fourth optical arrangement 14 is configured to direct the further expanded first component of the light beam away from the exit pupil expander 10 in the depth direction 86, causing it to be output from the exit pupil expander 10 via the front face 17.

Each time the expanded first component of light beam meets the sixth optical arrangement 16, there will be substantially no light coupled out of the exit pupil expander 10. This is due to the fact that the expanded first component of the light beam travels along the sixth optical arrangement 16 in a direction that is substantially parallel to the grating lines of the sixth optical arrangement 16.

In this example, the further expanded first component of the light beam passes through the sixth optical arrangement 16 on the front face 17 before exiting the exit pupil expander 10. However, very little of the further expanded first component of the light beam is diffracted by the sixth optical arrangement 16, because the sixth optical arrangement 16 is optimized to diffract light having a wavelength in the second spectral range (for example, red light) and not light having a wavelength in the first spectral range. Furthermore, any light resulting from diffraction of the further expanded first component by the sixth optical arrangement 16 will remain inside the exit pupil expander 10 or propagate substantially outside the field-of-view of the optical engine, ensuring that visible artefacts are not present in the observable light field.

FIGS. 4A and 4C schematically illustrate light rays 73 from the further expanded first component of the light beam being output from the exit pupil expander 10 via the front face 17.

Figure 5A:
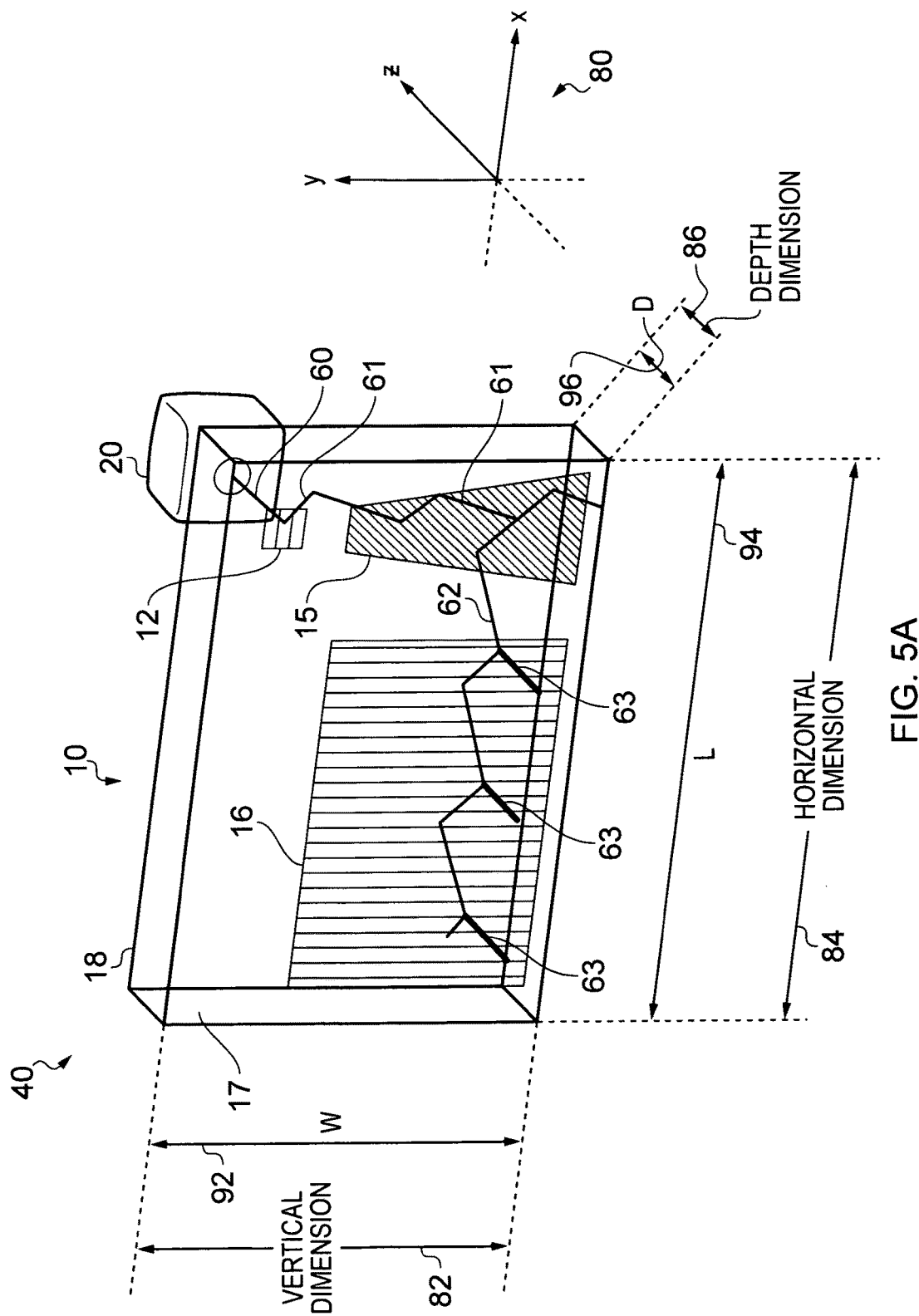
FIG. 5A illustrates a perspective view of the apparatus in use, expanding light having a wavelength within a second spectral range.

FIG. 5A illustrates a second component of a light beam, comprising a light ray 60, being output by the optical engine 20 and directed towards the rear face 18 of the exit pupil expander 10. The first, third and fourth optical arrangements 11, 13, 14 are not illustrated on the exit pupil expander 10 in FIG. 5A for clarity reasons.

The second component of the light beam has a wavelength in the second spectral range (corresponding with red light in this example). When the second component of the light beam meets the first optical arrangement 11 on the rear face 17 of the exit pupil expander, it passes directly though it. Very little of the second component of the light beam is diffracted by the first optical arrangement 11, because the first optical arrangement 11 is optimized to in-couple light having a wavelength in the first spectral range (for example, blue-green light) and not light having a wavelength in the second spectral range. The small part of the second component of the light beam that is coupled in by the first optical arrangement 11 propagates substantially in the same manner inside the exit pupil expander 10 as the first component of the light beam The second component of the light beam is coupled into the exit pupil expander 10 mainly by the second optical arrangement 12. The second optical arrangement 12 is configured to direct the second component of the light beam in a second direction, towards the fifth optical arrangement 15. In this example, the second direction has a component in the vertical dimension 82 and a component in the depth dimension 86, but does not have a component in the horizontal dimension 84.

Figure 5B:
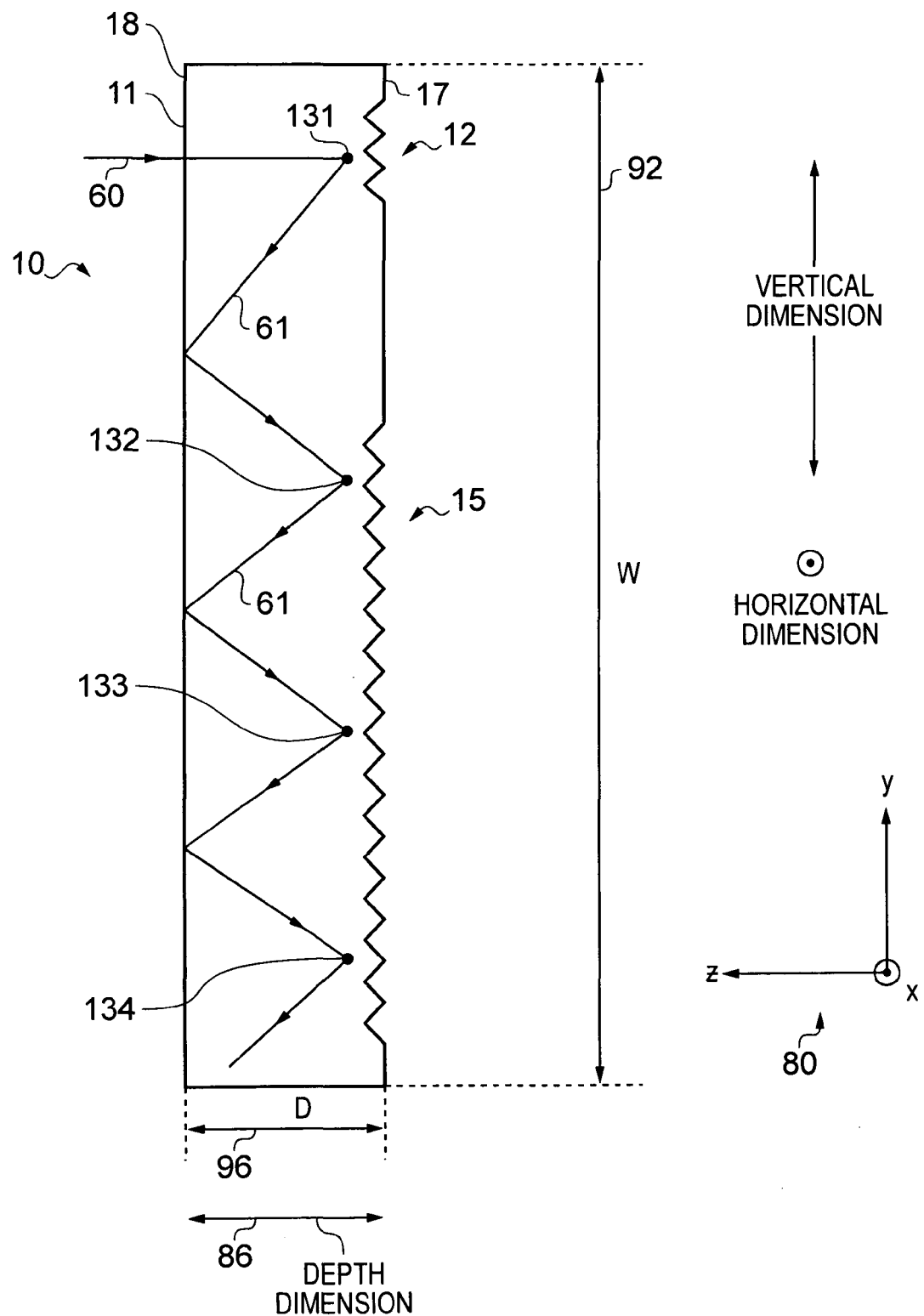
FIG. 5B illustrates a third cross section of the apparatus in use, expanding light having a wavelength within a second spectral range.

FIG. 5B illustrates a cross-section of the exit pupil expander 10 that is taken through the second and fifth optical arrangements 12, 15 in a plane defined by the vertical dimension 82 and the depth dimension 86.

FIG. 5B shows the light ray 60 being diffracted by the second optical arrangement 12 when it reaches the second optical arrangement 12 at point 131. The diffracted light ray is denoted with the reference numeral 61.

In this example, when the second component of the light beam has been coupled into the exit pupil expander 10, it undergoes total internal reflection within the exit pupil expander 10. The second component of the light beam is guided within the exit pupil expander 10 in the vertical dimension 82. This is depicted by the path of the light ray 61 illustrated in FIGS. 5A and 5B.

When the second component of the light beam has been coupled into the exit pupil expander by the second optical arrangement 12, it may meet the first optical arrangement 11. However, since the grating lines of the first optical arrangement 11 are substantially orthogonal to the grating lines of the second optical arrangement 12, and because the grating period of the first optical arrangement 11 is optimized to diffract light having a wavelength different to that of the second component, there will be substantially no further diffraction of the in-coupled second component by first optical arrangement 11.

As the second component of the light beam travels across the exit pupil expander 10 in the vertical dimension 82, it meets the fifth optical arrangement 15 on multiple occasions. FIG. 5B schematically illustrates the light ray 61 meeting the fifth optical arrangement 15 on three occasions, denoted by points 132-134.

Each time the second component of light beam meets the fifth optical arrangement 15, a portion of the light beam is diffracted towards the sixth optical arrangement 16 and the remainder of the light beam continues travelling along the exit pupil expander 10 in the vertical dimension 82.

The multiple diffractions that occur as the light beam travels across the fifth optical arrangement 15 cause expansion of the second component of the light beam in the vertical dimension 82, creating an expanded second component of the light beam. FIG. 5A illustrates a light ray 62 from the expanded first component of the light beam travelling towards the sixth optical arrangement 16.

Figure 5C:
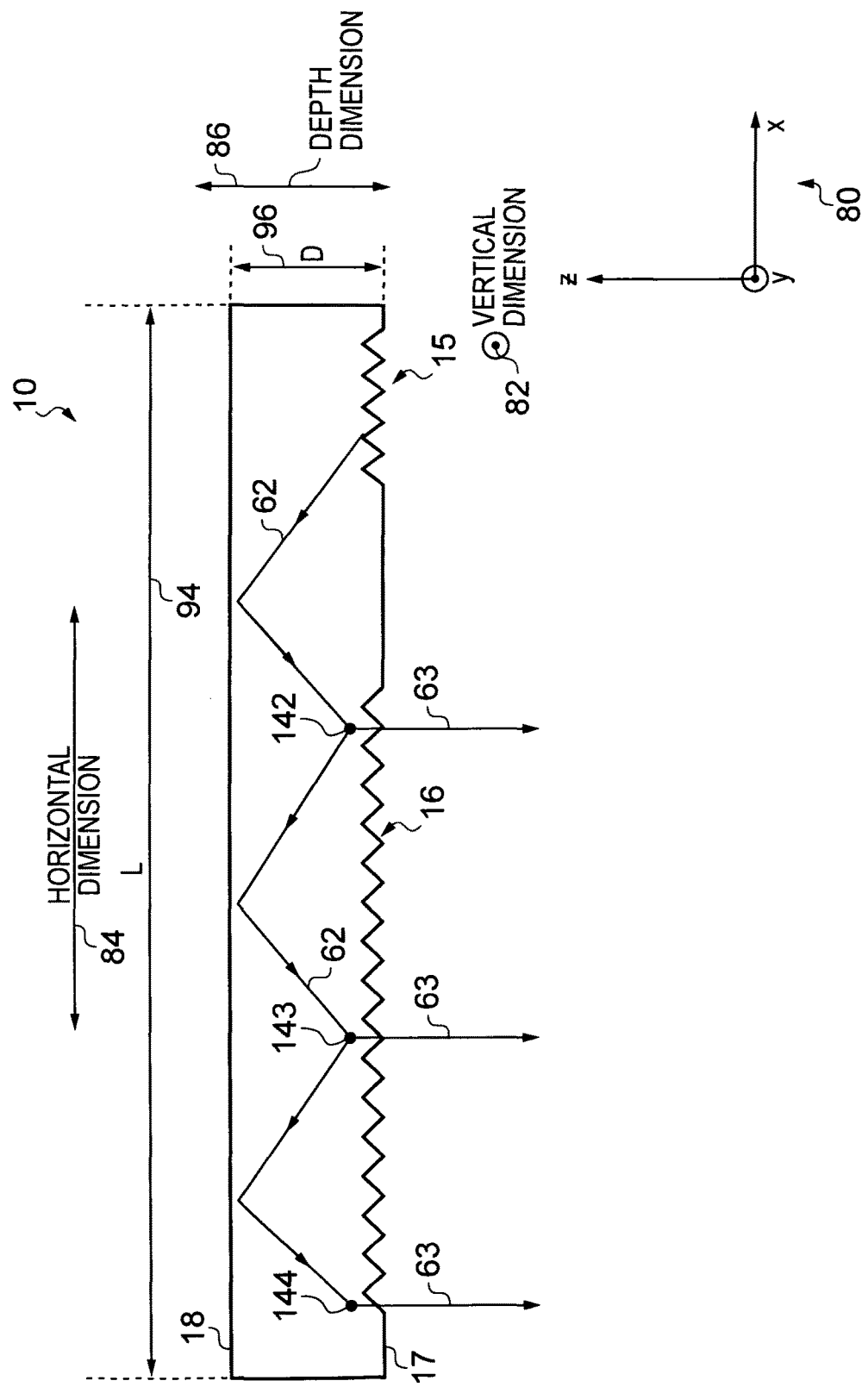
FIG. 5C illustrates a fourth cross section of the apparatus in use, expanding light having a wavelength within the second spectral range.

FIG. 5C illustrates a cross section of the exit pupil expander 10 that is taken through the fifth and sixth optical arrangements 15, 16 in a plane defined by the horizontal dimension 84 and the depth dimension 86.

The expanded second component of the light beam undergoes total internal reflection within the exit pupil expander 10, following diffraction by the fifth optical arrangement 15. The expanded first component of the light beam is guided along the exit pupil expander 10 in the horizontal dimension 84. This is depicted by the path of the light ray 62 illustrated in FIGS. 5A and 5C.

As the expanded second component of the light beam travels across the exit pupil expander 10 in the horizontal dimension 82, it meets the fourth and sixth optical arrangements 14, 16 on multiple occasions. FIG. 5C schematically illustrates the light ray 62 meeting the sixth optical arrangement 14 on three occasions, denoted by points 142-144.

Each time the expanded second component of light beam meets the sixth optical arrangement 16, a portion of the expanded second component of the light beam is diffracted. The remainder of the light beam continues travelling along the exit pupil expander 10 in the horizontal dimension 84.

The multiple diffractions that occur as the light beam travels across the sixth optical arrangement 16 cause expansion of the expanded second component of the light beam in the horizontal dimension 84, creating a further expanded second component of the light beam.

The sixth optical arrangement 16 is configured to direct the further expanded second component of the light beam away from the exit pupil expander 10 in the depth direction 86, causing it to be output from the exit pupil expander 10 via the front face 17.

Each time the expanded second component of light beam meets the fourth optical arrangement 14, there will be substantially no light coupled out of the exit pupil expander 10. This is due to that fact that the expanded second component of the light beam travels along the fourth optical arrangement 14 in a direction that is substantially parallel to the grating lines of the fourth optical arrangement 14.

FIGS. 5A and 5C schematically illustrate light rays 63 from the further expanded second component of the light beam being output from the exit pupil expander 10 via the front face 17.

Figure 6:
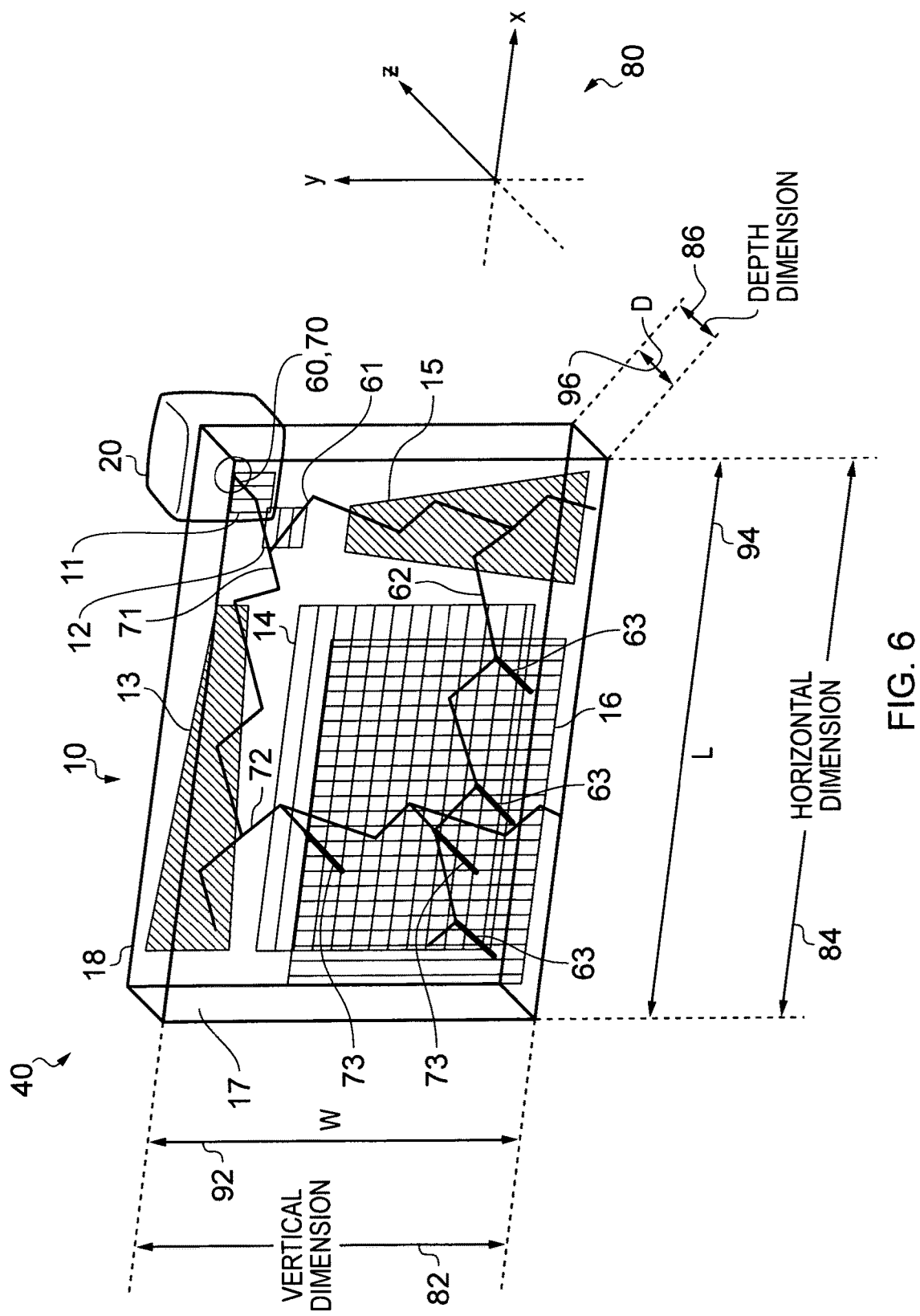
FIG. 6 illustrates a perspective view of the apparatus in use, expanding light having wavelengths within the first and second spectral ranges.

FIG. 6 illustrates the combined red-green-blue (RGB) operation of the system 40. Each of the six optical arrangements 11-16 is illustrated in FIG. 6.

The exit pupil expander 10 is configured to expand a first component of a light beam, having a wavelength in a first spectral range, and a second component of a light beam, having a wavelength in a second spectral range. Both the first component and the second component are expanded in a first dimension and a second dimension.

The exit pupil expander 10 may potentially expand first and second components of each light beam that is output by the optical engine 20. The exit pupil expander 10 therefore expands the exit pupil of the optical engine 20 which enables a user to see, on a virtual display, an enlarged version of an image displayed on a micro-display in the optical engine 20.

The first and second optical arrangements 11, 12 of the exit pupil expander 10 are configured to direct different components of an incident light beam in different directions. This enables a particular component of the incident light beam, having a particular wavelength, to be expanded using optical arrangements (for example, gratings) that are optimized for expanding light having that particular wavelength. This means that, advantageously, the virtual image formed from light output from the exit pupil expander has a relatively even colour distribution.

A further advantage of embodiments of the invention is that the exit pupil expander 10 is relatively light and compact, since it is made from a single substrate.

Figure 7:
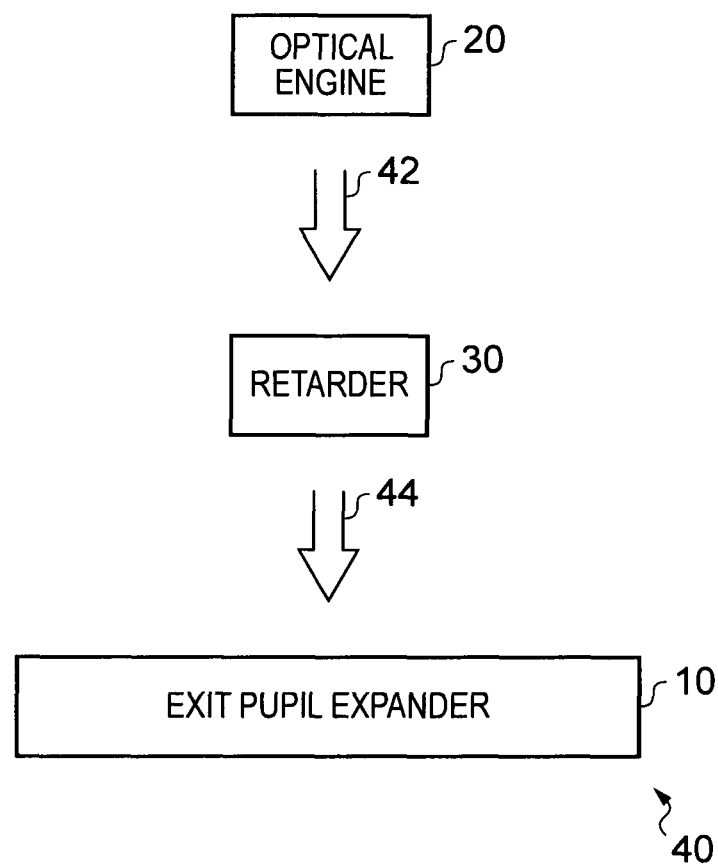
FIG. 7 illustrates a system including an optical engine, a retarder and an exit pupil expander.

FIG. 7 illustrates a system 40. The system 40 illustrated in FIG. 7 differs from the system illustrated in FIGS. 4A, 5A and 6 in that it comprises a retarder 30 positioned intermediate the optical engine 20 and the exit pupil expander 10.

In the FIG. 7 implementation of the invention, each light beam output by the optical engine 20 comprises linearly polarized light. That is, the direction of the electric field of the light is confined to a particular plane aligned with the direction of propagation of the light. The arrow 42 illustrates linearly polarized light being output by the optical engine 20.

The first component of a light beam comprises linearly polarized light having an electric field that is aligned with the grating lines in the first optical arrangement 11. For instance, in the example illustrated in FIG. 4A, the grating lines of the first optical arrangement 11 are aligned with the vertical dimension 82. The electric field of the first component of the light beams output by the optical engine 20 is therefore also aligned with the vertical dimension 82.

Alignment of the electric field of the first component of the light beams and the grating lines results in strong transverse electric wave coupling between the first component of the light beam and the first optical arrangement 11.

The coupling is more efficient than, for example, if the electric field of the first component of the light beams were perpendicular to the grating lines of the first optical arrangement 11.

The retarder 30 is configured not to rotate the electric field of the first component of the light beams. Thus, in this example, the retarder 30 has no (or very little) effect on the way in which the first component of the light beams is coupled into the exit pupil expander 10.

The retarder 30 is configured to rotate the electric field of the second component of the light beam. The retarder 30 may, for example, be a half-wave retarder that rotates the electric field of the second component of the light beams by substantially 90 degrees.

When a light beam is output by the optical engine 20, the second component of the light beam comprises linearly polarized light having an electric field that is aligned with the vertical dimension 82 (and perpendicular to the grating lines of the second optical arrangement 12). The retarder 30 rotates the electric field of the second component of the light beams by substantially 90 degrees, causing the electric field of the second component to become aligned with the grating lines of the second optical arrangement 12.

Alignment of the electric field of the second component of the light beams and the grating lines results in strong transverse electric wave coupling between the second component of the light beams and the second optical arrangement 12. The coupling is more efficient than, for example, if the electric field of the second component of the light beams were perpendicular to the grating lines of the second optical arrangement 12. Use of the retarder 30 may improve the overall coupling efficiency in the range of 30%-70%.

The arrow 44 in FIG. 7 illustrates the first and second components of the light beams being output by the retarder 30.

Figure 8:
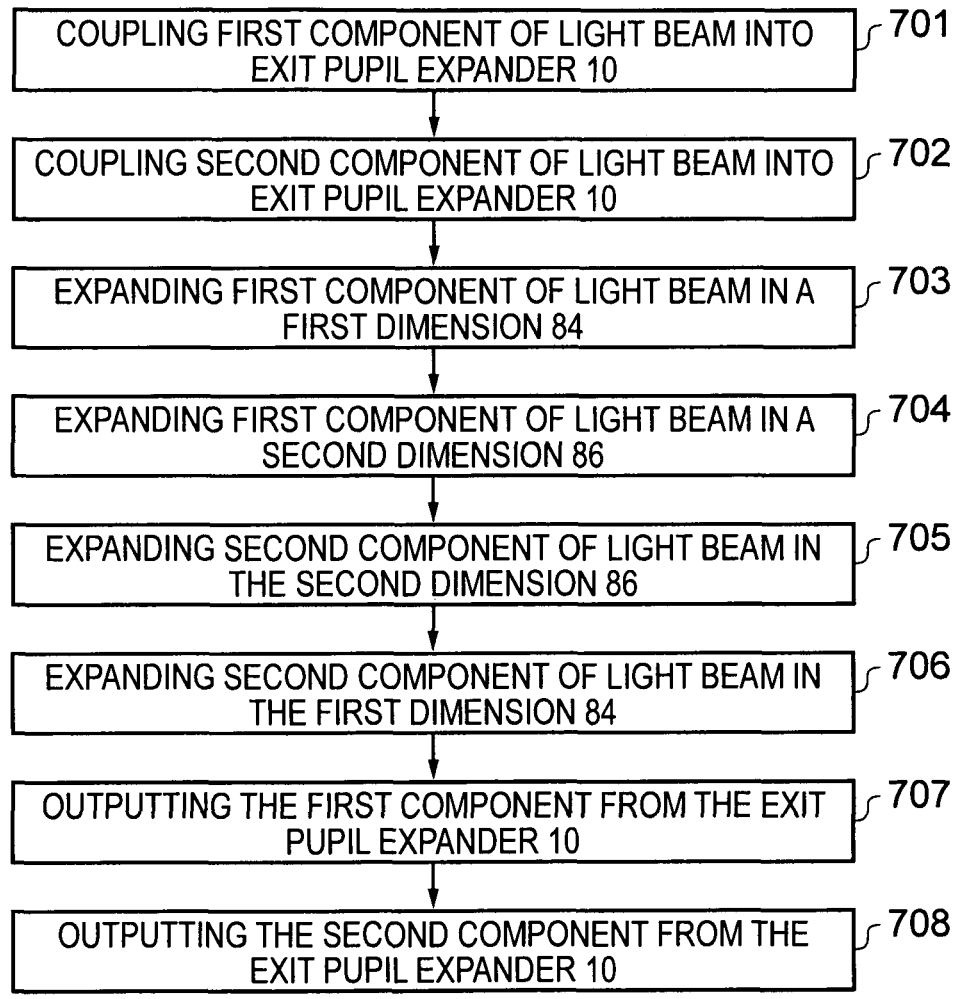
FIG. 8 illustrates a method.

FIG. 8 illustrates a method according to embodiments of the invention. At block 701 of FIG. 8, a first component of a light beam, having a wavelength with a first spectral range, is coupled into an exit pupil expander 10.

At block 702, a second component of a light beam, having a wavelength within a second spectral range, is coupled into the exit pupil expander 10.

At block 703, the first component of the light beam is expanded in a first dimension to create an expanded first component. The first dimension may, for example, be the horizontal dimension 82 illustrated in the figures.

At block 704, the expanded first component is expanded in a second dimension to create a further expanded first component. The second dimension may, for example, be the vertical dimension 84 illustrated in the figures.

At block 705, the second component of the light beam is expanded in the second dimension to create an expanded second component.

At block 706, the expanded second component is expanded in the first dimension to create a further expanded second component.

At block 707, the further expanded first component of the light beam is output from the exit pupil expander 10.

At block 708, the further expanded second component of the light beam is output from the exit pupil expander 10.

The illustration of a particular order to the blocks in FIG. 7 does not necessarily imply that there is a required or preferred order for the blocks and the order and arrangement of the blocks may be varied. Furthermore, it may be possible for some blocks to be omitted.

Figure 9:
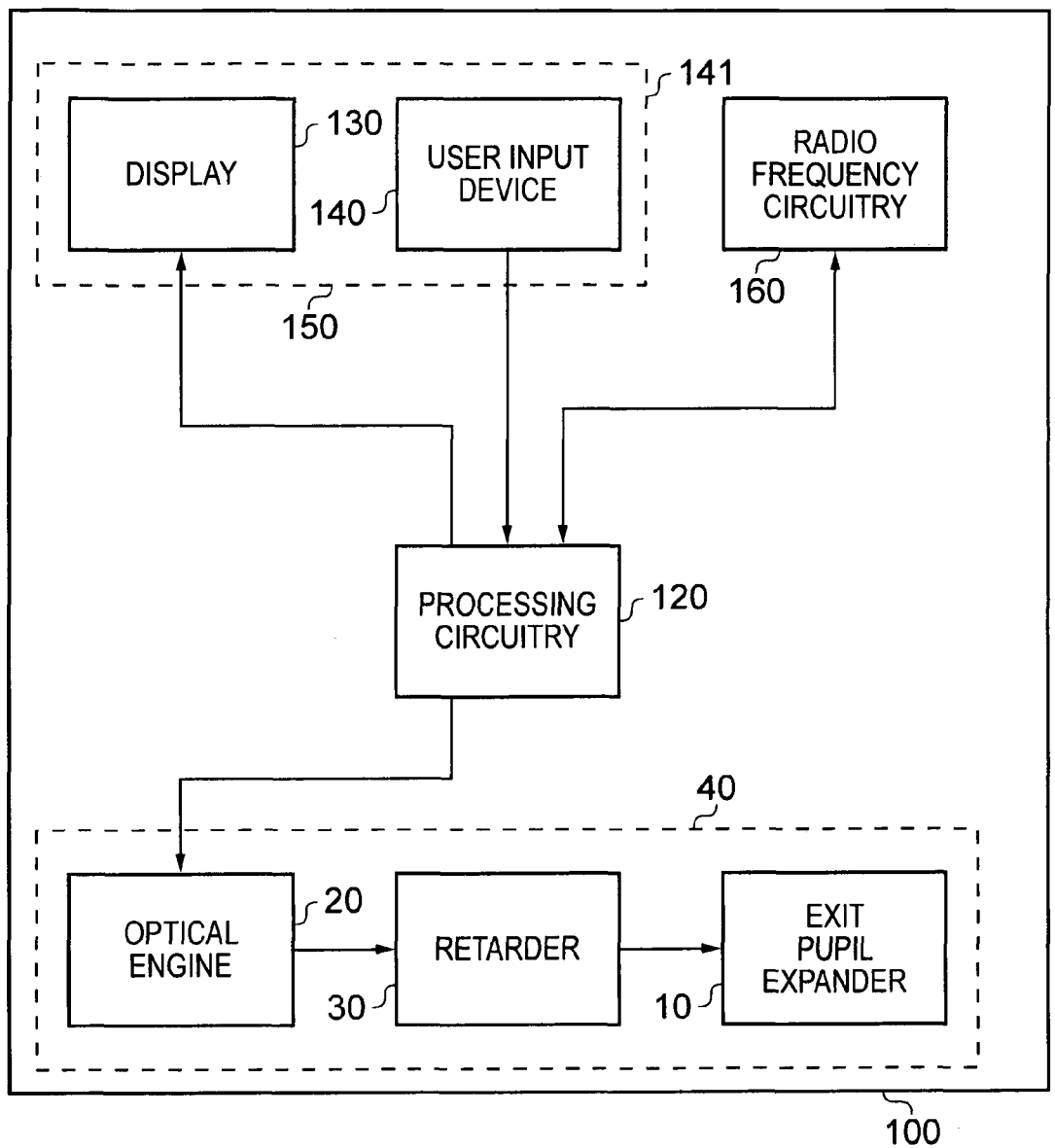
FIG. 9 illustrates a schematic of an electronic device.

FIG. 9 illustrates an electronic device 100. The electronic device 100 may, for example, be a hand portable device such as a mobile telephone, a personal music player, a personal digital assistant or a games console. The electronic device 100 is illustrated as comprising the system 40 illustrated in FIG. 7.

The electronic device 100 may further comprise processing circuitry 120, a display 130, a user input device 140 and radio frequency circuitry 160. The processing circuitry 120 may be configured to provide outputs to the optical engine 20, the display 130 and the radio frequency circuitry 160. The processing circuitry 120 may be configured to receive inputs from the user input device 140 and the radio frequency circuitry 160.

The display 130 and the user input device 140 may, for example, be integrated in a touch sensitive display 141.

Although embodiments of the present invention have been described in the preceding paragraphs with reference to various examples, it should be appreciated that modifications to the examples given can be made without departing from the scope of the invention as claimed. For example, the exit pupil expander 10 may not be cuboidal in shape.

In some alternative embodiments of the invention, the first, third and fourth optical arrangements 11, 13, 14 need not be on the same side of the exit pupil expander 10 as one another. Similarly, the second, fifth and sixth optical arrangements 12, 15, 16 need not be on the same side of the exit pupil expander 10 as one another.

In the FIG. 7 implementation of the invention, the first and second components of the light beams output by the optical engine 20 are described as comprising linearly polarized light having an electric field aligned with the vertical dimension 82. Alternatively, the first and second components of the light beams output by the optical engine 20 may comprise linearly polarized light having an electric field aligned with the horizontal dimension 84. In this case, the retarder 30 is configured to rotate the electric field of the first component of the light beams rather than the second component, to align the electric field of the first component with the grating lines of first optical arrangement 11.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:
1. An apparatus, comprising:
a first optical arrangement configured to couple a first component of a light beam into the apparatus, the first component of the light beam having a wavelength within a first spectral range;
a second optical arrangement configured to couple a second component of the light beam into the apparatus, the second component of the light beam having a wavelength within a second spectral range, different to the first spectral range;

a third optical arrangement configured to expand the first component of the light beam in a first dimension to create an expanded first component;

a fourth optical arrangement configured to expand, in a second dimension, the expanded first component to create further expanded first component, and configured to output the further expanded first component of the light beam from the apparatus;

a fifth optical arrangement configured to expand the second component of the light beam in the second dimension to create an expanded second component; and a sixth optical arrangement configured to expand, in the first dimension, the expanded second component to create a further expanded second component, and configured to output the further expanded second component from the apparatus collinear with the further expanded first component of the light beam from the apparatus;

wherein the expanded first component of the light beam from the fourth optical arrangement and the expanded second component of the light beam from the sixth optical arrangement each comprise light rays that are substantially parallel to each other and are divergent;

wherein the fourth optical arrangement is spaced apart from and aligned with the sixth optical arrangement and separated therefrom;

wherein the sixth optical arrangement is configured to diffract the light beam having a wavelength within the second spectral range and not the light beam having a wavelength within the first spectral range;

wherein grating lines of the fifth optical arrangement are angled with respect to grating lines of the second optical arrangement and grating lines of the sixth optical arrangement; and wherein grating lines of the third optical arrangement are angled with respect to grating lines of the first optical arrangement and grating lines of the fourth optical arrangement.

2. An apparatus as claimed in claim 1, wherein the apparatus is made from a single substrate.

3. An apparatus as claimed in claim 1, wherein the first optical arrangement is configured to direct the first component of the light beam in a first direction, towards the third optical arrangement.

4. An apparatus as claimed in claim 3, wherein the first direction has a component in the first dimension and does not have a component in the second dimension.

5. An apparatus as claimed in claim 1, wherein the second optical arrangement is configured to direct the second component of the light beam in a second direction, towards the fifth optical arrangement.

6. An apparatus as claimed in claim 5, wherein the second direction has a component in the second dimension but does not have a component in the first dimension.

7. An apparatus as claimed in claim 1, wherein at least one of the first, second, third, fourth, fifth and sixth optical arrangements is a diffraction grating.

8. An apparatus as claimed in claim 7, wherein the at least one of the first, second, third, fourth, fifth and sixth optical arrangements is a surface relief diffraction grating or a holographic element.

9. An apparatus as claimed in claim 1, wherein the first optical arrangement is configured to be more efficient at coupling light, having a wavelength within the first spectral range, into the apparatus than light having a wavelength within the second spectral range.

10. An apparatus as claimed in claim 1, wherein the second optical arrangement is configured to be more efficient at coupling light, having a wavelength within the second spectral range, into the apparatus than light having a wavelength within the first spectral range.

11. An apparatus as claimed in claim 1, wherein there is no overlap between the first spectral range and the second spectral range.

12. An apparatus as claimed in claim 1, wherein the apparatus comprises at least a first face and a second face, and wherein the first, third and fourth optical arrangements are situated on the first face, and the second, fifth and sixth optical arrangements are situated on the second face.

13. A system comprising an apparatus as claimed in claim 1, and an optical engine configured to provide the light beam.

14. A system as claimed in claim 13, further comprising a retarder intermediate the optical engine and the apparatus, wherein each of the first and second components of the light beam comprise polarized light having an electric field confined to a plane of propagation; and retarder is configured to rotate the electric field of the first component and configured not to rotate the electric field of the second component, or the retarder is configured to rotate the electric field of the second component and configured not to rotate the electric field of the first component.

15. An electronic device comprising the system of claim 13, comprising at least one user input device.

16. An apparatus as claimed in claim 1, wherein the fifth optical arrangement is trapezoidal in shape and has two parallel sides of different lengths aligned with a horizontal dimension of the apparatus.

17. A method, comprising:

coupling a first component of a light beam into an exit pupil expander, the first component of the light beam having a wavelength within a first spectral range;

coupling a second component of the light beam into the exit pupil expander, the second component of the light beam having a wavelength within a second spectral range, different to the first spectral range;

expanding the first component of the light beam in a first dimension to create an expanded first component;

expanding, in a second dimension, the expanded first component to create a further expanded first component;

expanding the second component of the light beam in the second dimension to create an expanded second component;

expanding, in the first dimension, the expanded second component to create a further expanded second component;

outputting the further expanded first component of the light beam from the exit pupil expander; and outputting the further expanded second component from the exit pupil expander collinearly with the further expanded first component;

wherein the expanded first component of the light beam and the expanded second component of the light beam each comprise light rays that are substantially parallel to each other and are divergent;

wherein the further expanded first component of the light beam is outputted from the exit pupil expander at a point that is spaced apart from and aligned with a point at which the further expanded second component of the light beam is outputted;

wherein grating lines of a fifth optical arrangement used to expand the second component of the light beam in the second dimension are angled with respect to grating lines of a second optical arrangement used to couple the second component of the light beam into the exit pupil expander and grating lines of a sixth optical arrangement used to expand, in the first dimension, the expanded second component; and wherein grating lines of a third optical arrangement used to expand the first component of the light beam in the first dimension are angled with respect to grating lines of a first optical arrangement used to couple the first component of the light beam into the exit pupil expander and grating lines of a fourth optical arrangement used to expand, in the second dimension, the expanded first component.

18. A method as claimed in claim 17, wherein the first component of the light beam is directed in a first direction, towards the third optical arrangement, upon coupling into the exit pupil expander.

19. An method as claimed in claim 18, wherein the first direction has a component in the first dimension and does not have a component in the second dimension.

20. A method as claimed in claim 17, the second component of the light beam is directed in a second direction, towards the fifth optical arrangement, upon coupling into the exit pupil expander.

21. A method as claimed in claim 20, wherein the second direction has a component in the second dimension but does not have a component in the first dimension.

22. A method claimed in claim 17, wherein the first and second components of the light beam are expanded by diffraction.

23. A method as claimed in claim 17, wherein the exit pupil expander comprises a first optical arrangement and a second optical arrangement, and a higher proportion of the first component of the light beam is coupled into the exit pupil expander by the first optical arrangement than by the second optical arrangement.

24. A method as claimed in claim 23, wherein a higher proportion of the second component of the light beam is coupled into the exit pupil expander by the second optical arrangement than by the first optical arrangement.

25. A method as claimed in claim 17, wherein there is no overlap between the first spectral range and the second spectral range.

26. A method as claimed in claim 17, wherein each of the first and second components of the light beam comprise polarized light having an electric field confined to a plane of propagation; and:
the electric field of the first component is rotated prior to the first component being coupled into the exit pupil expander, and the electric field of the second component is not rotated prior to the second component being coupled into the exit pupil expander, or
the electric field of the second component is rotated prior to the second component being coupled into the exit pupil expander, and the electric field of the first component is not rotated prior to the first component being coupled into the exit pupil expander.

27. An apparatus, comprising:
means for coupling a first component of a light beam into the apparatus, the first component of the light beam having a wavelength within a first spectral range;
means for coupling a second component of the light beam into the apparatus, the second component of the light beam having a wavelength within a second spectral range, different to the first spectral range;
means for expanding the first component of the light beam in a first dimension to create an expanded first component;
means for expanding, in a second dimension, the expanded first component to create a further expanded first component, and configured to output the further expanded first component of the light beam from the apparatus;
means for expanding the second component of the light beam in the second dimension to create an expanded second component; and
means for expanding, in the first dimension, the expanded second component to create a further expanded second component, and configured to output the further expanded second component from the apparatus collinear with the further expanded first component of the light beam from the apparatus;
wherein the expanded first component of the light beam and the expanded second component of the light beam each comprise light rays that are substantially parallel to each other and are divergent;
wherein the means for expanding the first component of the light beam is spaced apart from and aligned with the means for expanding the second component of the light beam;
wherein the means for expanding the second component is configured to diffract the light beam having a wavelength in the second spectral range and not the light beam having a wavelength in the first spectral range;
wherein grating lines of the means for expanding the second component of the light beam in the second dimension are angled with respect to grating lines of the means for coupling a second component of the light beam into the apparatus and grating lines of the means for expanding, in the first dimension, the expanded second component; and
wherein grating lines of the means for expanding the first component of the light beam in a first dimension are angled with respect to grating lines of the means for coupling a first component of a light beam into the apparatus and grating lines of the means for expanding, in a second dimension, the expanded first component.

28. An apparatus as claimed in claim 27, wherein the apparatus is made from a single substrate.

* * * * *